United States Patent Office 3,563,965
Patented Feb. 16, 1971

3,563,965
PROCESS FOR THE PREPARATION OF A CYA-
NATED VINYL MONOMER - CONTAINING
COPOLYMER HAVING RESISTANCE TO
COLORATION
Akihiko Kishimoto, Takehiko Okamoto, Tosiro Kawai,
and Masakazu Inoue, Nagoya, Japan, assignors to Toyo
Rayon Kabushiki Kaisha, Tokyo, Japan, a corporation
of Japan
No Drawing. Filed Jan. 22, 1968, Ser. No. 699,317
Claims priority, application Japan, Jan. 23, 1967,
42/4,194
Int. Cl. C08f 15/04, 15/22
U.S. Cl. 260—80.81                                    6 Claims

ABSTRACT OF THE DISCLOSURE

In the preparation of a copolymer containing less than 40% by weight of a cyanated vinyl monomer by aqueous suspension polymerization, resistance to coloration is imparted to the copolymer by adding a saturated higher aliphatic alcohol having 12 to 18 carbon atoms to the polymerization system.

The present invention relates to a process for the preparation of a copolymer containing as a copolymeric component a cyanated vinyl monomer, said copolymer having resistance to coloration, by aqueous suspension polymerization.

A copolymer containing as a copolymeric component a cyanated vinyl monomer like acrylonitrile or methacrylonitrile is, as seen in, for instance, a styrene-acrylonitrile copolymer or a styrene-methyl methacrylate-acrylonitrile copolymer, known as a very useful material due to its excellent transparency and processability as a thermoplastic resin for molding as well as other physical and chemical properties.

However, these resins have shortcomings, as compared with other transparent resins, for instance, acrylic thermoplastic resin and polystyrene, of tending to be yellowed or dark yellowed by thermal history at the time of molding.

On account of that, heretofore various processes have been proposed as processes for preventing coloration of a copolymer containing a cyanated vinyl monomer like acrylonitrile.

For instance, in Japanese patent application Publication No. 7,393/1958 (published Aug. 27, 1958), a process of adding alkylene diamine alkanol derivatives which is the condensation product of propylene oxide and alkylene diamine, to a styrene-acrylonitrile copolymer is described, while in Japanese patent application Publication No. 14,936/1960 (published Oct. 10, 1960), a process of adding a volatile organic cyanogen or ammonia upon preparing an acrylonitrile-containing copolymer by bulk polymerization is described.

As a process for the preparation of a cyanated vinyl monomer-containing copolymer, there are various polymerization processes such as, for instance, bulk polymerization, emulsion polymerization, solution polymerization and suspension polymerization, and such a copolymer is prepared by such polymerization processes on industrial scales, of which suspension polymerization process is a most important polymerization process due to various advantages such as that the produced resin being obtained in bead state, it is convenient for blending with other substances, and the step is easily controllable in respect of production technology, above all, suspension polymerization in an aqueous medium is most important.

However, in case of carrying out suspension polymerization of a cyanated vinyl monomer such as acrylonitrile in an aqueous medium, due to considerable dissolution of said cyanated vinyl monomer in water, besides the intended monomer composition and beads having the intended particle size, emulsion polymerized particles are apt to be produced, which emulsion polymerized particles are colored due to heating at the time of molding or become a cause for 'haze' of a molded article, further, in an extreme case, they may become even a cause for yellowing of bead slurry amid the polymerization step.

In order to overcome these difficulties, no sufficient effect could be obtained by such prior art processes for preventing coloration as mentioned above, accordingly, the fact remains that a process for directly obtaining a cyanated vinyl monomer-containing copolymer having sufficient resistance to coloration by aqueous suspension polymerization has been none.

An object of the present invention is to provide a process for the preparation of a cyanated vinyl monomer-containing copolymer having resistance to coloration by aqueous suspension polymerization.

As a result of strenuous research for achieving said object, the present inventors have found that by carrying out aqueous suspension polymerization after adding a higher saturated aliphatic alcohol to a cyanated vinyl monomer to be polymerized, it is possible to remarkably reduce production of emulsion polymerized particles and coloration of the polymer beads so obtained due to heating at the time of molding has become remarkably less.

The term, "a cyanated vinyl monomer" as referred to in the present invention is a compound of the formula

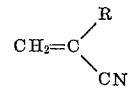

(wherein R is hydrogen or a lower alkyl group, and in case of a lower alkyl group, $CH_3$ is especially preferable).

The present invention relates to a process which comprises carrying out aqueous suspension polymerization of a vinyl copolymer having copolymerized at most 40% by weight of at least one of the cyanated vinyl monomers of said formula, adding 0.01–5 parts by weight of a higher saturated aliphatic alcohol of the formula

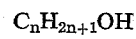

$$C_nH_{2n+1}OH$$

(wherein $n$ is an integer of 12–18) to 100 parts by weight of said monomer, thereby preparing a cyanated vinyl monomer-containing copolymer having resistance to coloration.

And in the process of the present invention a remaining at least 60% by weight comonomer copolymerized with said cyanated vinyl monomer is at least one vinyl comonomer copolymerizable with said cyanated vinyl monomer selected from the group consisting of an aromatic vinyl monomer of the formula

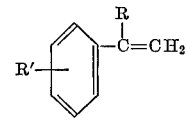

(wherein both R and R' stand for hydrogen or a lower alkyl group), and an acrylic monomer of the formula

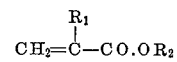

(wherein $R_1$ stands for hydrogen or a lower alkyl group and $R_2$ stands for a lower alkyl group).

In said comonomer, as an aromatic vinyl monomer, styrene is especially preferable and as an acrylic monomer, methyl methacrylate is especially preferable.

Also, in the aqueous suspension polymerization of the present invention, the polymerization reaction mixture may contain below 10% by weight of a plasticizer or rubber-like polymer substance (for instance, polymers of butadiene such as butadiene homopolymer, a butadiene-styrene copolymer, a butadiene-acrylonitrile copolymer or polymers of isoprene such as polyisoprene or natural rubber and the like). Also, said reaction mixture may contain a usually employed photostabilizer or heat stabilizer in a small amount.

Coloration of a cyanated vinyl monomer-containing copolymer does not matter too much when the content of said cyanated vinyl monomer is below 10% by weight, however, the coloration becomes remarkable when the content becomes at least 10% by weight.

In the present invention, as a process for preventing this coloration, it is important to add saturated aliphatic alcohols having 12–18 carbon atoms to the aqueous suspension polymerization system. An alcohol having not more than 11 carbon atoms is not preferable because its boiling point is low, volatilization of the produced polymer at the time of molding is intense and foams are produced in the resultant molded article, while an alcohol having at least 19 carbon atoms is practically difficult to obtain and economically disadvantageous. A saturated aliphatic alcohol having 14 to 18 carbon atoms is especially preferred because any silver streak or spot mark is hardly formed in the molding of resins and because the thermal deformation temperature and softening point are hardly lowered by addition of said alcohol.

As an adding amount of these alcohols, based on 100 parts by weight of the monomer used, it is 0.01–5 parts by weight, preferably 0.2–1 part by weight, with an amount less than that coloration prevention effect remarkably decreases, while with an amount more than that, not only coloration prevention is obtained, but also transparency of the resin is obstructed and mechanical properties of the resin lowers as well.

The aqueous suspension polymerization of the present invention is practicable by the known process.

The initiation reaction of the polymerization is ordinarily initiated by a free radical generating agent, however, it can be initiated by heat as well.

As said free radical generating agent, a peroxide (containing hydroperoxide) or an azo compound may be used, however, generally an izo compound is preferred to a peroxide. Namely, the effect of the present invention is especially remarkable when an azo compound is used. As a preferably azo compound, azobisisobutyronitrile and azobisdimethyl valeronitrile may be cited.

Also, as a suspension stabilizer to the aqueous suspension polymerization, an inorganic colloidal substance like barium sulfate and calcium carbonate, or a water-soluble organic high molecular weight substance like polyvinyl alcohol, carboxy methyl cellulose and sodium polymethacrylate may be used.

Generally speaking, the using concentration of these suspension stabilizers is in the range of from 0.5 to 3 parts per 100 parts of the monomer in the case of an inorganic suspension agent, and in the range of from 0.005 to 0.05 part per 100 parts of the monomer in the case of a water-soluble highly polymeric substance.

The concentrations of monomers upon carrying out the aqueous suspension polymerization are generally 1/1–1/3 of monomer to water ratio.

The reaction temperature at the time of the polymerization is 50–140° C., the pH being 4–10.

The present invention will be explained hereinbelow with reference to examples, however, the present invention will not be limited by the following examples. In the following examples, parts mean parts by weight.

EXAMPLE 1

In a mixture consisting of 75 parts of styrene, 25 parts of acrylonitrile, 0.4 part of azobisisobutyronitrile and 0.2 part of n-dodecyl mercaptan, 0.5 part of cetyl alcohol of $C_{16}H_{33}OH$ was dissolved and mixed, the mixture was added dropwise to 250 parts of ion exchange water colloidally dispersing 1.0 part of $BaSO_4$ as a suspension stabilizer, and the resultant aqueous solution was suspended with stirring, the temperature was raised from 70° to 120° C. in 5 hours and the aqueous solution was polymerized in a $N_2$ gas. The polymer beads obtained after the bead slurry was dehydrated, washed with water and dried, thereafter by compression molding a 1 mm.-thick sheet was produced.

For the purpose of comparison, of a monomer mixture not containing cetyl alcohol, by exactly the same operations, a sheet was produced. Transmittances of these two sheets at a wave length of 450 m$\mu$ were measured and the measured values were made indications of coloration. The results were as follows.

A styrene/acrylonitrile (75/25) copolymer

Cetyl alcohol:  Transmittance (450m$\mu$), percent
 (a) 0.5 part added _____ 89.1
 (b) Non-added _____ 75.3

Also after the two were heat treated at 180–190° C. in air for 20 minutes, the similar measuring was carried out.

Cetyl alcohol:  Transmittance (450m$\mu$), percent
 (a) 0.5 part added _____ 88.3
 (b) Non-added _____ 51.9

EXAMPLE 2

In a mixture consisting of 70 parts of styrene, 30 parts of acrylonitrile, 0.8 part of lauroyl peroxide and 0.4 part of n-dodecyl mercaptan, 1.0 part of lauryl alcohol of $C_{12}H_{25}OH$ was dissolved and mixed, the resultant mixture was suspension polymerized using polyvinyl alcohol as a suspension stabilizer in 200 parts of ion exchange water at 80–100° C., the obtained bead polymer was dehydrated, washed with water and dried and same as in Example 1, a 1 mm.-thick sheet was prepared.

As a comparative example, of a reaction system not containing lauryl alcohol, by the similar operations a sheet was produced. Transmittances of these two sheets at a wave length of 450 m$\mu$ were measured.

A styrene/acrylonitrile (70/30) copolymer

Lauryl alcohol:  Transmittance (450 m$\mu$), percent
 (a) 1.0 part added _____ 88.4
 (b) Non-added _____ 70.2

EXAMPLE 3

In a mixture consisting of 70 parts of styrene, 30 parts of acrylonitrile, 0.8 part of lauroyl peroxide and 0.4 part of n-dodecyl mercaptan, 1.0 part of myristyl alcohol of $C_{14}H_{29}OH$ was dissolved and mixed, the resultant mixture was suspension polymerized using polyvinyl alcohol as a suspension stabilizer in 200 parts of ion exchange water at 80–100° C., the obtained granular polymer was dehydrated, washed with water and dried, thereby a 1 mm.-thick sheet was produced as in Example 1.

As a comparative example, of a reaction system not containing myristyl alcohol, by the similar operations a sheet was prepared.

Transmittances of these two sheets at a wave length of 450 m$\mu$ were measured.

A styrene/acrylonitrile (70/30) copolymer

Myristyl alcohol:  Transmittance (450 m$\mu$), percent
 (a) 1.0 part added _____ 87
 (b) Non-added _____ 70

EXAMPLE 4

In a mixture consisting of 70 parts of styrene, 30 parts of acrylonitrile, 0.15 part of azobisisobutyronitrile, 0.3 part of 2,2'-azobis-(2,4-dimethylvaleronitrile) and 0.4 part of n-dodecyl mercaptan, 1.0 part of lauryl alcohol of $C_{12}H_{25}OH$ was dissolved and mixed and using polyvinyl alcohol as a suspension stabilizer, the resultant mixture was suspension polymerized at first at 60° C. for 3 hours and then at 100° C. raised from 60° C. for 1 hour in 200 parts of ion exchange water. The obtained bead polymer was dehydrated, washed with water and dried, thereby same as in Example 1, a 1 mm.-thick sheet was produced.

As a comparative example, of a system not containing lauryl alcohol, a sheet was produced by the similar operations.

Transmittances of these two sheets at a wave length of 450 m$\mu$ were measured.

A styrene/acrylonitrile (70/30) copolymer

| Lauryl alcohol: | Transmittance (450 m$\mu$), percent |
|---|---|
| (a) 1.0 part added | 86 |
| (b) Non-added | 69 |

EXAMPLE 5

Example 1 was repeated except using a mixture of 0.25 part of stearyl alcohol with 0.25 part of cetyl alcohol as higher saturated aliphatic alcohol, resulting in obtaining a styrene/acrylonitrile (75/25) copolymer added with and without a higher alcohol.

The results of measuring transmittance of 1 mm.-thick sheets of the obtained copolymers at a wave length of 450 m$\mu$ were as follows.

A styrene/acrylonitrile (75/25) copolymer

| A higher alcohol mixture | | Transmittance (450 m$\mu$), (percent) | Transmittance (650 m$\mu$), (percent) |
|---|---|---|---|
| (a) | 0.5 part added | 89.0 | 89.6 |
| (b) | Non-added | 74.2 | 82.3 |

EXAMPLE 6

Example 1 was repeated except using methacrylonitrile instead of acryonitrile used therein, and transmittances of the obtained sheets were measured.

As shown below, the results were that in case cetyl alcohol was added, an excellent stabilization to thermal coloration was exhibited.

A styrene/methacrylonitrile (75/25) copolymer

| Cetyl alcohol: | Transmittance (450 m$\mu$), percent |
|---|---|
| (a) 0.5 part added | 87.0 |
| (b) Non-added | 72.1 |

EXAMPLE 7

A mixed monomer consisting of 50 parts of styrene, 40 parts of methyl methacrylate, 10 parts of acrylonitrile, 0.2 part of n-dodecyl mercaptan and 0.4 part of azobisisobutyronitrile, added with 0.3 part and 0 part of cetyl alcohol, was suspension polymerized as in Example 2. The obtained polymer beads were measured of their transmittances at a wave length of 450 m$\mu$ as in Examples 1–4. The results were shown below.

A styrene/methylmethacrylate/acrylonitrile (50/40/10) copolymer

| Cetyl alcohol: | Transmittance (450 m$\mu$), percent |
|---|---|
| (a) 0.3 part added | 90.6 |
| (b) Non-added | 85.3 |

EXAMPLE 8

In a mixture consisting of 75 parts of styrene, 20 parts of acrylonitrile, 5 parts of methacrylonitrile, 0.4 part of azobisisobutyronitrile and 0.2 part of n-dodecyl mercaptan, 0.5 part of cetyl alcohol of $C_{16}H_{33}OH$ was dissolved and mixed, using 1.0 part of $BaSO_4$ as a suspension stabilizer colloidally dispersed dropwise in 250 parts of ion exchange water, the resultant mixture was stirred and suspended, and while the temperature was raised from 70° C. to 120° C. it was polymerized in a $N_2$ gas atmosphere. The polymer beads obtained after the bead slurry were dehydrated, washed with water, dried and thereafter a 1 mm.-thick sheet was produced by compression molding.

For the purpose of comparison, of the monomer mixture not containing cetyl alcohol, by the similar operations a sheet was produced.

Transmittances of these two sheets were measured at a wave length of 450 m$\mu$, the results were made indications of coloration, that were as follows.

A styrene/acrylonitrile/methacrylonitrile (75/20/5) copolymer

| Cetyl alcohol: | Transmittance (450 m$\mu$), percent |
|---|---|
| (a) 0.5 part added | 88 |
| (b) Non-added | 74 |

After the two sheets were heat treated in air for 20 minutes, the similar measuring was carried out with the following results.

| Cetyl alcohol: | Transmittance (450 m$\mu$), percent |
|---|---|
| (a) 0.5 part added | 87.5 |
| (b) Non-added | 52 |

EXAMPLE 9

In a mixture consisting of 70 parts of styrene and 25 parts of acrylonitrile, 5 parts of polybutadiene containing no gels were dissolved, to the resultant solution, 0.2 part of azobisisobutyronitrile was added, the entirety was polymerized at 70° C. for 1 hour, to the resultant prepolymer, 0.2 part of n-dodecyl mercaptan and 0.8 part of lauroyl peroxide were added and dissolved therein, the resultant solution was added dropwise to 200 parts of ion exchange water dispersing colloidally 1.5 parts of $BaSO_4$ as a suspension agent, the temperature was raised from 70° C. to 110° C. in 4 hours and the entire aqueous solution was polymerized in a $N_2$ gas atmosphere. The obtained polymer beads were dehydrated, washed with water and dried. On the other hand, polymerization was carried out by exactly the same operations of said monomer rubber solution added with 0.5 part of cetyl alcohol, to obtain polymer beads. From these two kinds of beads, two sheets were produced as in Examples 1–5, that were heat treated at 180–190° C. for 20 minutes in air, and degrees of coloration were adjudicated with naked eyes.

A styrene/acrylonitrile/polybutadiene (70/25/5) copolymer

| Cetyl alcohol: | Degree of coloration |
|---|---|
| (a) 0.5 part added | Yellow |
| (b) Non-added | Brown |

In view of the foregoing examples, the effect of the present invention is apparent.

What is claimed is:
1. A process for preparing a cyanated vinyl monomer-containing copolymer having resistance to coloration which comprises aqueous suspension copolymerizing at a temperature of from 50° C. to 140° C. in the presence of a free-radical generating catalyst and water as the principle polymerization medium: (a) 10%–40% by weight, based on the total of comonomers, of at least one cyanated vinyl monomer of the formula

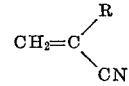

(wherein R is hydrogen or a lower alkyl group), with (b) 60%–90% by weight, based on the total of comonomers, of a vinyl monomer copolymerizable with said cyanated vinyl monomer and selected from (A) an aromatic vinyl monomer of the formula

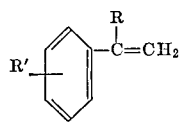

(wherein both R and R' stand for hydrogen or a lower alkyl group) and (B) a mixture of said aromatic vinyl monomer, and an acrylic monomer of the formula

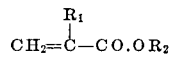

(wherein $R_1$ stands for hydrogen or a lower alkyl group and $R_2$ stands for a lower alkyl group), the aromatic vinyl monomer being present in said mixture in an amount such that the said aromatic vinyl monomer comprises at least 50% by weight, based on the weight of the total monomers, said process being characterized in that the suspension copolymerization is carried out in the presence of at least one higher saturated aliphatic alcohol of the formula

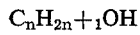

(wherein $n$ is an integer of 12–18) in an amount of 0.01–5 parts by weight to 100 parts by weight of total comonomers.

2. A process according to claim 1 wherein said cyanated vinyl monomer is acrylonitrile.

3. A process according to claim 1 wherein said higher aliphatic alcohol is added in an amount of 0.2–1 part, by weight per 100 parts by weight of the total monomers.

4. A process according to claim 1 wherein said aromatic vinyl monomer is styrene.

5. A process according to claim 1 wherein said acrylic monomer is methyl methacrylate.

6. A process according to claim 1 wherein said $n$ of said formula $C_nH_{2n+1}OH$ is 14–18.

References Cited
UNITED STATES PATENTS

| | | | |
|---|---|---|---|
| 2,587,465 | 2/1952 | Ham et al. | 260—85.5N |
| 2,798,868 | 7/1957 | Miller | 260—85.5Orig. |
| 2,895,938 | 7/1959 | Ohlinger et al. | 260—85.5N |

HARRY WONG, JR., Primary Examiner

U.S. Cl. X.R.

260—80.6, 85.5, 879, 880, 881